United States Patent [19]

Kume et al.

[11] 4,443,550

[45] Apr. 17, 1984

[54] GLASS COMPOSITION SUITABLE FOR PRODUCTION OF FIBROUS WOLLASTONITE, METHOD FOR PRODUCING SAID WOLLASTONITE, AND WOLLASTONITE OBTAINED THEREBY

[75] Inventors: Makoto Kume; Toshiaki Mizuno, both of Hyogo, Japan

[73] Assignee: Nippon Sheet Glass Co., Ltd., Osaka, Japan

[21] Appl. No.: 298,395

[22] Filed: Sep. 1, 1981

[30] Foreign Application Priority Data

Sep. 1, 1980 [JP]  Japan ................................ 55/120830

[51] Int. Cl.$^3$ ........................ C03C 3/08; C03C 3/22; C03C 15/00
[52] U.S. Cl. .................................... 501/65; 156/663; 423/331; 501/5; 501/36; 501/66; 501/72; 501/77; 501/95
[58] Field of Search ...................... 501/5, 8, 35, 36, 65, 501/66, 72, 95, 77; 65/33; 156/663; 423/331

[56] References Cited

U.S. PATENT DOCUMENTS

| | | | |
|---|---|---|---|
| 2,580,662 | 1/1952 | Danzin | 501/65 |
| 3,300,670 | 1/1967 | Veres | 501/65 |
| 3,413,133 | 11/1968 | Stalego | 501/65 |
| 3,799,836 | 3/1974 | Rogers et al. | 501/8 |
| 3,955,989 | 5/1976 | Nakamura | 501/5 |
| 3,964,917 | 6/1976 | Nakamura | 501/5 |
| 4,060,401 | 11/1977 | Maries et al. | 65/111 |

Primary Examiner—Mark Bell
Attorney, Agent, or Firm—Sughrue, Mion, Zinn, Macpeak and Seas

[57] ABSTRACT

A glass composition suitable for production of a fibrous wollastonite comprising, in % by weight:

| | |
|---|---|
| $SiO_2$ | 35 to 60 |
| $CaO$ | 30 to 55 |
| $B_2O_3$ | 1 to 30 |
| $Li_2O$ | 0 to 4 |
| $Al_2O_3$ | 0 to 8 |
| and $Na_2O + K_2O$ | 0 to 8 | a method for producing said fibrous wollastonite using the glass composition, and fibrous wollastonite obtained by the method.

14 Claims, 7 Drawing Figures

GLASS COMPOSITION SUITABLE FOR PRODUCTION OF FIBROUS WOLLASTONITE, METHOD FOR PRODUCING SAID WOLLASTONITE, AND WOLLASTONITE OBTAINED THEREBY

FIELD OF THE INVENTION

The present invention relates to a glass composition suitable for production of a fibrous wollastonite which is aligned in one direction and can be used as a reinforcing material for Portland cement, alumina cement, calcium silicate, and the like, a method for producing said fibrous wollastonite using the glass composition, and fibrous wollastonite obtained by the method.

BACKGROUND OF THE INVENTION

Heretofore, methods for producing fibrous wollastonite (hereafter referred to as "wollastonite") have been known, as described, for example, in U.S. Pat. Nos. 3,799,836 and 4,060,401.

In accordance with these methods, a bar-like base glass is produced and heated up to a predetermined temperature progressively from the edge portion thereof by a heater to crystallize wollastonite crystals in the glass, the heater is moved according to the crystallization to produce a mixture of bundles of wollastonite crystals and a glass matrix phase, and the bar-like crystallized glass is pulverized to obtain crystallized glass containing needles of wollastonite therein.

In any of the crystallized glasses containing wollastonite crystals produced by the above methods, when the crystallized glass is used as a reinforcing fibrous material, it is necessary to disintegrate the wollastonite present in the crystallized glass into individual units. Therefore, the crystallized glass is pulverized to obtain wollastonite. In the pulverization, however, cleavage easily occurs along the cleavage plane of the wollastonite crystal, but breakage also occurs at areas other than the cleavage plane. Therefore, the aspect ratio (ratio of length in a longitudinal direction to length in a vertical direction) is smaller than in the crystallized glass.

With these crystallized glasses, therefore, no great reinforcing effect as a reinforcing material can be expected.

Further, with the glass compositions described above, the yield of wollastonite from the base glass is low, a heat-treatment for crystallization of the base glass requires very high precision, and efficiency of production is low.

SUMMARY OF THE INVENTION

Investigations have been made to overcome the disadvantages involved in the prior art, and thus the present invention has been made.

One object of the present invention is to provide a glass composition which enables to increase the yield of needle wollastonite by a very simple heat treatment.

Another object of the present invention is to provide a method for producing a fibrous wollastonite using the glass composition.

Still another object of the present invention is to provide a fibrous wollastonite obtained by the method.

Therefore, in one aspect, the present invention constitutes glass composition suitable for production of a fibrous wollastonite comprising, in % by weight:

| | |
|---|---|
| $SiO_2$ | 35 to 60 |
| CaO | 30 to 55 |
| $B_2O_3$ | 1 to 30 |
| $Li_2O$ | 0 to 4 |
| $Al_2O_3$ | 0 to 8 |
| and $Na_2O + K_2O$ | 0 to 8 |

In another aspect, the present invention constitutes method for producing a fibrous wollastonite which comprises heat treating a glass composition as described above to form a crystallized glass containing therein bundles of needle wollastonite crystals, and physically, chemically, or physically and chemically treating the crystallized glass to disintegrate the bundles of the wollastonite crystals.

In still another aspect, the invention constitutes a fibrous wollastonite obtained by the foregoing method.

BRIEF DESCRIPTION OF THE DRAWINGS

All photographs have a magnification of 100×.

DETAILED DESCRIPTION OF THE INVENTION

Wollastonite has a molecular formula of $CaSiO_3$, and is a crystal composed of equimolar amounts of $SiO_2$ and CaO. Theoretically, therefore, when the weight ratio of $SiO_2$ to CaO is equal to a ratio of molecular weights of $SiO_2$ and CaO (60:56), the maximum yield can be obtained. Actually, however, in an $SiO_2$-CaO two component system, vitrification can be achieved only when the molar percent of $SiO_2$ is within the range of 64.5 to 84.5 (when expressed in % by weight, 66 to 85). Furthermore, in order to stabilize the glass and lower the melting temperature, other components should be added as well as the two components of $SiO_2$ and CaO. Moreover, when the base glass is heated, crystallization of needlelike wollastonite (hereafter simply "needle wollastonite") does not always necessarily occur.

Normally, wollastonite has three crystal forms. "Wollastonite crystal" as used herein refers to a low temperature type wollastonite which shows fibrous growth.

The glass composition according to the present invention comprises, in % by weight, 35 to 60% $SiO_2$, 30 to 55% CaO, 1 to 30% $B_2O_3$, 0 to 4% $Li_2O$, 0 to 8% $Al_2O_3$, and 0 to 8% $Na_2O + K_2O$. According to the particular base glass composition, the yield of wollastonite from the base glass can be increased to at least 80%, and a heat treatment for crystallization to crystallize needle wollastonite from the base glass can be carried out without the use of such precise control as was required in the prior art. That is, needle wollastonite is crystallized in the base glass in the form of bundles by merely maintaining the base glass at a temperature of from 750° C. to 1,150° C. for several hours, resulting in the formation of a crystallized glass in which needle wollastonite and the residual glassy matrix phase coexist. Therefore, when the crystallized glass is physically and/or chemically treated to cause cleavage thereof, the fibrous wollastonite can be easily obtained. Further, with the glass composition of the invention, the needle wollastonite can be produced directly by precisely controlling the rate of cooling in the course of solidification of the molten base glass without the application of a secondary step of heat treatment for crystallization.

Hereinafter, the reasons for which the range of each component constituting the glass composition of the invention is limited will be explained.

When $SiO_2$ is less than 35 wt%, the yield of wollastonite is decreased, vitrification becomes difficult, and devitrification tends to occur. The devitrification prevents the growth of needle wollastonite. On the other hand, when $SiO_2$ is more than 60 wt%, tridymite, cristobalite, etc., are crystallized simultaneously with wollastonite, preventing the crystallization of needle wollastonite. The preferred amount for $SiO_2$ is from 45 to 55 wt%.

When CaO is less than 30 wt.%, the yield of wollastonite is reduced, whereas then it is more than 55 wt%, the amount of $SiO_2$ is necessarily reduced, as a result of which the yield of wollastonite is decreased and vitrification becomes difficult. The preferred amount for CaO is from 35 to 45 wt%.

$B_2O_3$ has the effect that it enters into a mixture having a composition similar to that of wollastonite to facilitate the vitrification, and lowers the melting point. In addition, it remains as a glassy matrix between wollastonite particles after the heat treatment, increasing the coefficient of thermal expansion of the matrix glass, and therefore the cleavage of needle wollastonite is increased. When $B_2O_3$ is less than 1 wt%, the effect is not sufficient, whereas when it is more than 30 wt%, no wollastonite is formed even by the application of a heat treatment. The preferred amount for $B_2O_3$ is from 1 to 6 wt%.

Addition of a small amount of $Li_2O$ prevents the formation of α-type wollastonite, which does not form needle crystals, from crystallizing from an $SiO_2$-CaO-$B_2O_3$ three component glass, and thus $Li_2O$ has the effects of crystallizing the β-type wollastonite and of lowering the melting point. When $Li_2O$ is more than 4 wt%, devitrification occurs easily. The preferred amount for $Li_2O$ is from 0.2 to 2 wt%.

$Al_2O_3$ has the effect of improving workability during molding of the glass. When it is more than 8 wt%, devitrification is liable to occur, preventing the growth of wollastonite. The preferred amount for $Al_2O_3$ is from 1 to 6 wt%.

Alkaline metal oxides of $Na_2O$ and $K_2O$ lower the melting point of glass and improve the workability during molding of glass.

Since the amount of the glass phase in the crystallized glass is small, the effect of $Na_2O$ and $K_2O$ can be obtained even though they are added in small amounts. When it is more than 8 wt%, the crystallization of wollastonite by the heat treatment becomes difficult. The preferred amount for $Na_2O+K_2O$ is from 1 to 5 wt%.

Furthermore, $Na_2O$ and $K_2O$ are scarcely soluble in the wollastonite crystal crystallized by the heat treatment and remain in the glass phase, reducing the alkali resistance of the residual glass phase and allowing the residual glass phase to be eluted easily with the aqueous alkali solution. This effect is significant when the weight ratio of $Na_2O$ to ($Na_2O+K_2O$) is 0 to 0.8. In such a case (elution with an aqueous alkali solution), the preferred amount for $Na_2O+K_2O$ is from 1 to 7 wt%, wherein $Na_2O$ is from 0 to 4 wt% and $K_2O$ is from 1 to 7 wt%.

In addition to the above components, one or more of the following oxides may be added to the base glass as a stabilizer: 0 to 6 wt% MgO; 0 to 6 wt% SrO; 0 to 6 wt% BaO; 0 to 4 wt% MnO; 0 to 4 wt% CoO; 0 to 4 wt% NiO; 0 to 8 wt% ZnO; 0 to 4 wt% SnO; 0 to 4 wt% PbO; 0 to 6 wt% $TiO$; 0 to 6 wt% $ZrO_2$; and 0 to 6 wt% $Fe_2O_3$. The total amount of the oxides can be up to 10 wt%.

The method for producing a fibrous wollastonite according to the present invention comprises heat treating the base glass composition to form a crystallized glass containing therein bundles of needle wollastonite crystals, and physically, chemically, or physically and chemically treating the crystallized glass to disintegrate bundles of the needle crystals.

The heat treatment is generally conducted at temperature of from 750° C. to 1,150° C. for at least 2 hours.

One type of physical treatment for the crystallized glass is pulverization using, for example, a ball mill. Another type of physical treatment is a method comprising rapidly cooling the crystallized glass heated at high temperature to cleave bundles of the needle crystals.

The typical example of the chemical treatment for crystallized glass is a method comprising immersing the crystallized glass in an eluting solution to elute only the glass phase in the crystallized glass.

In principle, any liquids capable of selectively eluting only the glass matrix phase can be used as the eluting solution for use in the immersion step. In view of the functions that the eluting solution does not react with wollastonite and elutes the glass phase alone, aqueous alkaline solutions are preferred. Of these aqueous alkaline solutions, an aqueous NaOH solution and an aqueous KOH solution are particularly preferred. The concentration of the alkaline aqueous solution is preferably at least 0.3 N. Two or more alkaline aqueous solutions may be used in combination with each other. In this case, the total alkali concentration is also preferably at least 0.3 N.

The temperature of the eluting solution is preferably at least 50° C. since the rate of elution increases as the temperature increases. When the temperature is less than 50° C., the processing time required for eluting the glass phase is undesirably lengthened. Although the immersion can be performed at high temperature, the immersion temperature is preferably 400° C. or less, in view of the stability of the crystals. Furthermore, taking into consideration available industrial production equipment, the immersion temperature is preferably 230° C. or less (i.e., a saturated steam pressure of about 30 kg/cm$^2$).

This chemical method can provide the advantage that wollastonite crystals can be obtained in the form as they are present in the crystallized glass without use of mechanical technique such as pulverization.

The wollastonite crystal obtained according to the present invention can be used as a reinforcing fibrous material for various materials. Furthermore, it is known that the wollastonite crystal has excellent alkali resistance. Even in highly alkaline medium such as Portland cement, therefore, the reinforcing effect of wollastonite crystals is not reduced.

The present invention is now illustrated in greater detail by reference to the following examples. However, the present invention is not to be construed as being limited to those examples only. Unless otherwise indicated, all parts, percents, ratios and the like are by weight.

Table 1 in Example 1 indicates glass compositions falling within the range of the invention, falling outside the range of the invention, and falling within the range of the prior art, and the results after application of heat treatment for crystallization. Sample No. 1 is a glass composition described in U.S. Pat. No. 3,799,836. Sample Nos. 2 and 3 are glass compositions falling outside the range of the invention. Sample Nos. 4 to 19 are glass compositions falling within the range of the invention. Of these samples, Sample Nos. 4 to 7 are glass composititons particularly suitable for the production of fibrous wollastonite.

EXAMPLE 1

Glass starting mixtures composed so as to provide the compositions of Sample Nos. 1 to 19 shown in Table 1 were melted for 270 minutes in a platinum crucible placed in an electric furnace maintained at 1,450° C., deposited on an iron plate to provide a 10 mm thick layer, and then cooled gradually from 600° C. to obtain a sheet of glass. The temperature of the glass thus produced was then raised from room temperature to 900° C. at a rate of 7.5° C./minute. By holding the glass at that temperature for from 2 to 8 hours, crystallization was completed. Then, the glass was rapidly cooled in water, and the glass thus cooled was pulverized to obtain fibrous wollastonite.

The presence of devitrification in the base glass was examined by optical microscopic analysis of the matrix glass before the application of crystallization treatment. The direction of needle crystal was determined by optical microscopic analysis of a sample which was separately prepared, subjected to a crystallization treatment, and gradually cooled. With regard to the yield of wollastonite, the fibrous wollastonite produced by the method as described above was immersed in an aqueous solution of caustic soda at 95° C. for from 24 to 240 hours to dissolve the glassy matrix phase, and the yield was determined by the difference in weight between after and before the dissolution. The determination of deposited crystal was made by X-ray diffraction.

Figure 1:
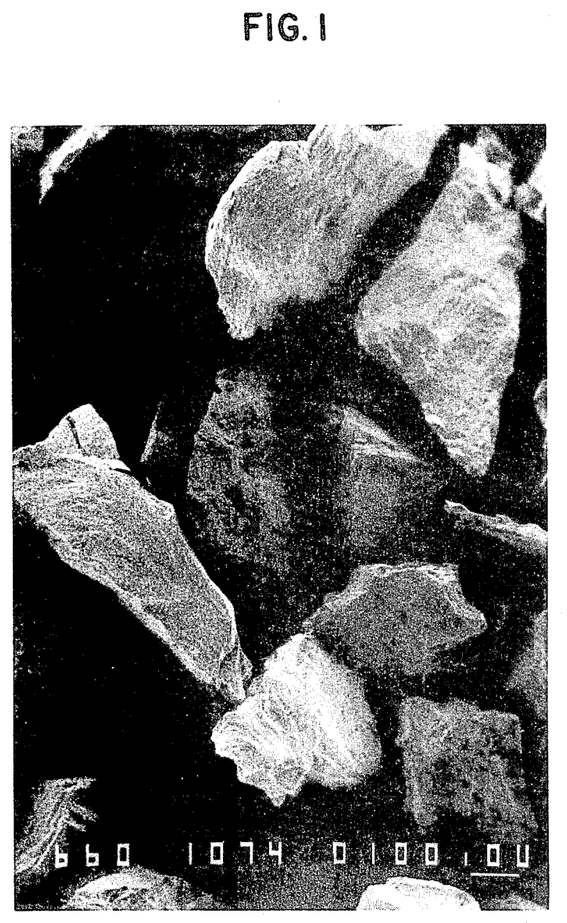
FIG. 1 is an enlarged photograph of a powder of Sample No. 1 prepared by pulverization in a mill after the heat treatment for crystallization.

In Sample Nos. 1 and 2, wollastonite was deposited, but since $B_2O_3$ and $Li_2O$ were not contained therein, the wollastonite did not grow up in the form of needle by application of the heat treatment for crystallization according to the invention. The pulverization product of Sample No. 1 was granular as shown in FIG. 1 and cleavage in the form of fibers did not occur.

Sample No. 3 was a glass composition prepared by adding $Li_2O$ to a composition similar to that of Sample No. 2. By addition of $Li_2O$, needle crystals were observed, but were not sufficient.

Sample Nos. 4 to 19 were compositions according to the invention. However, since a large amount of $B_2O_3$ was added in the case of Sample No. 8, a large amount of $Al_2O_3$ was added in the case of Sample No. 13, and $Li_2O$ was not added in the case of Sample No. 11, the growth of wollastonite was retarded. Since a large amount of $SiO_2$ was added in the case of Sample No. 10, and a large amount of $Li_2O$ was added in the case of Sample No. 12, devitrification was observed in the base glass. Sample Nos. 14 to 19 contained a stabilizer. In Sample Nos. 14, 16, 18 and 19, crystals other than wollastonite which could not be identified were also observed after the crystallization.

Figure 2:
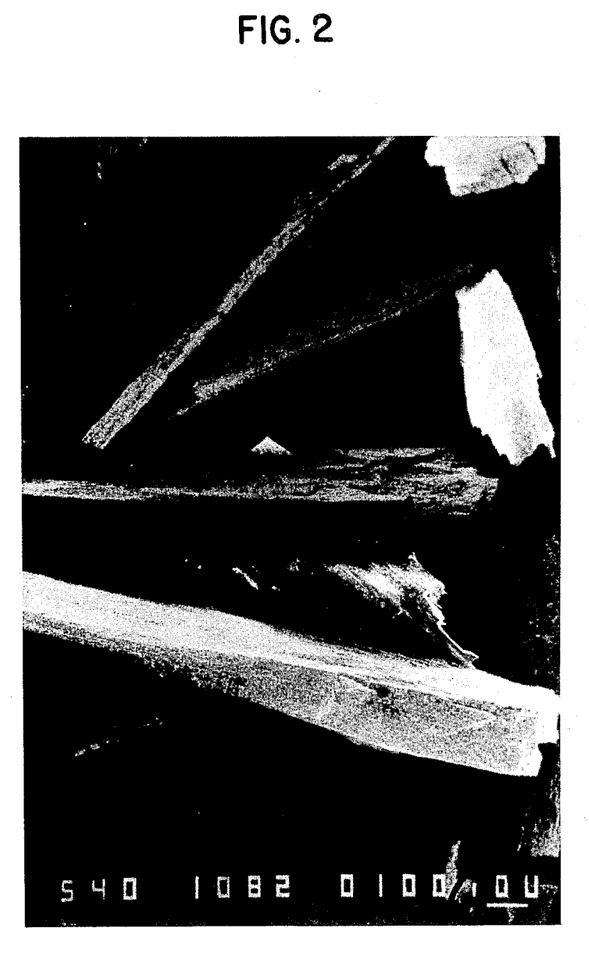
FIG. 2 is an enlarged photograph of a powder of Sample No. 5 prepared by pulverization in a mill after the heat treatment for crystallization.
Figure 3:
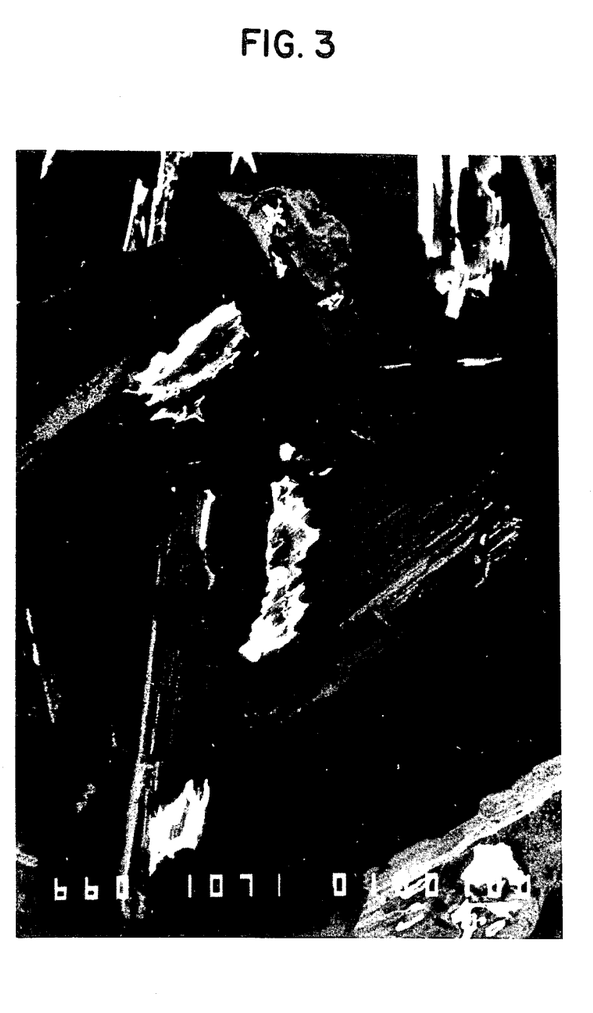
FIG. 3 is an enlarged photograph of a powder of natural wollastonite prepared by pulverization in a mill.
Figure 4:
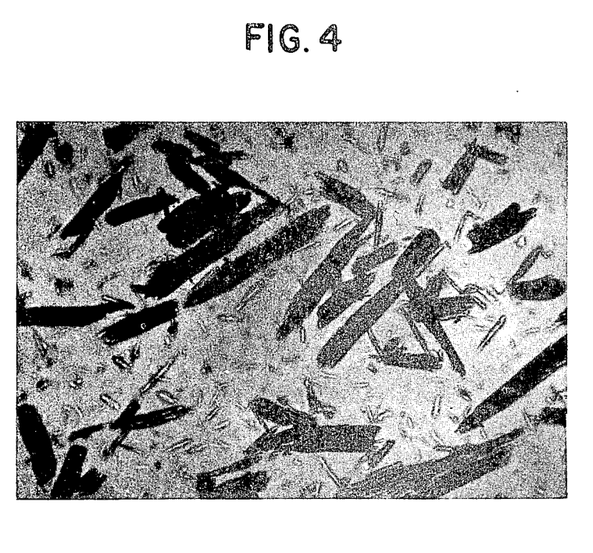
FIG. 4 is an enlarged photograph of powder after pulverization and passing through a 14 mesh-screen in Example 2.
Figure 5:
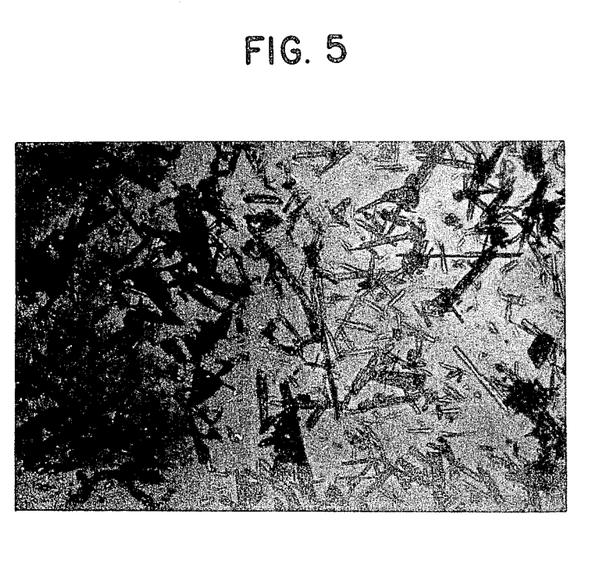
FIG. 5 is an enlarged photograph of powder after pulverization and passing through a 14 mesh-screen and an alkali treatment in Example 2.
Figure 6:
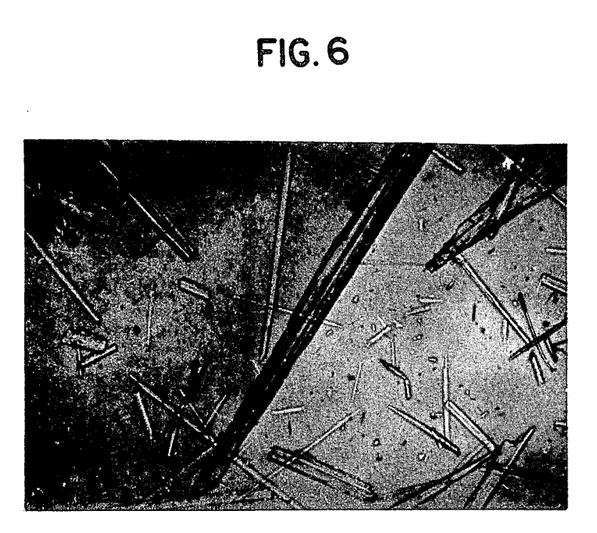
FIGS. 6 and 7 are enlarged photographs of powders of commercially available products.
Figure 7:
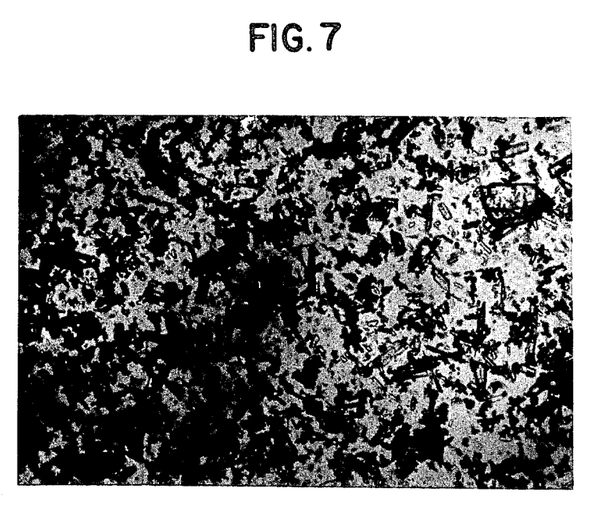

FIG. 2 shows the pulverization product of Sample No. 5 after the crystallization, and it can be seen from FIG. 2 that the cleavage into fibrous wollastonite occurred.

TABLE 1

| | Sample No. | | | | | | | | | | | | | | | | | | |
|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 |
| (% by weight) Components | | | | | | | | | | | | | | | | | | | |
| $SiO_2$ | 53.0 | 55.0 | 50.5 | 50.5 | 49.8 | 49.8 | 49.5 | 36.0 | 40.0 | 58.0 | 50.0 | 49.2 | 48.0 | 51.5 | 49.5 | 50.0 | 50.0 | 49.5 | 49.8 |
| CaO | 30.0 | 35.0 | 38.4 | 40.3 | 39.8 | 39.8 | 39.5 | 35.0 | 54.0 | 30.0 | 40.0 | 39.2 | 39.5 | 40.0 | 39.5 | 40.0 | 39.7 | 39.7 | 39.8 |
| $B_2O_3$ | — | — | — | 1.0 | 4.0 | 2.0 | 5.0 | 27.0 | 5.0 | 5.0 | 5.0 | 5.3 | 3.5 | 2.5 | 4.5 | 3.0 | 2.0 | 6.0 | 5.5 |
| $Li_2O$ | — | — | 1.0 | 0.2 | 0.5 | 0.5 | 2.0 | 1.0 | 1.0 | 1.0 | — | 3.0 | 0.5 | 1.0 | 0.5 | 1.0 | 0.3 | 0.5 | 0.5 |
| $Al_2O_3$ | 15.0 | 5.0 | 10.1 | 5.5 | 4.0 | 5.9 | 4.0 | 1.0 | — | 3.5 | 4.0 | 3.3 | 7.5 | 1.0 | 1.5 | 1.0 | — | 0.3 | 0.4 |
| $Na_2O$ | — | 5.0 | — | 2.0 | 2.0 | 0.5 | — | — | — | 0.5 | 1.0 | — | 1.0 | — | — | 1.0 | — | — | — |
| $K_2O$ | — | — | — | 0.5 | — | 1.5 | — | — | — | 2.0 | — | — | — | — | 1.0 | 1.0 | — | — | — |
| MgO | 2.0 | — | — | — | — | — | — | — | — | — | — | — | — | 4.0 | — | — | 2.0 | — | — |
| BaO | — | — | — | — | — | — | — | — | — | — | — | — | — | — | 4.0 | — | — | — | — |
| MnO | — | — | — | — | — | — | — | — | — | — | — | — | — | — | — | 3.0 | — | — | — |
| ZnO | — | — | — | — | — | — | — | — | — | — | — | — | — | — | — | — | 6.0 | — | — |
| $Fe_2O_3$ | — | — | — | — | — | — | — | — | — | — | — | — | — | — | — | — | — | 4.0 | — |
| $TiO_2$ | — | — | — | — | — | — | — | — | — | — | — | — | — | — | — | — | — | — | 4.0 |
| Results | | | | | | | | | | | | | | | | | | | |
| (1)*1 | No | No | No | No | No | No | No | No | No | Yes | No | Yes | No | Yes | No | No | No | Yes | No |
| (2)*2 | x | x | C | A | A | A | A | B | B | A | B | A | B | B | B | B | B | B | B |
| (3)*3 | W | W | W | W | W | W | W | W | W | W | W | W | W | W+ ? | W | W+ ? | W | W+ ? | W+ ? |

TABLE 1-continued

| | Sample No. | | | | | | | | | | | | | | | | | | |
|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 |
| (4)*4 | 55.0 | 61.6 | 65.4 | 81.4 | 82.0 | 79.7 | 80.3 | 62.5 | 65.6 | 55.9 | 74.5 | 76.0 | 76.1 | 78.5 | 79.6 | 76.8 | 76.5 | 75.3 | 77.8 |

Note:
*1: Presence of devitrification in the base glass
*2: Directional properties of needle crystal
x: No needle crystals were observed.
C: Needle crystals were observed.
B: The direction of needle crystals was aligned.
A: The direction of needle crystals was aligned to a high degree.
*3: Type of crystallized crystal
W: Wollastonite (ASTM Card 27-1064)
?: Crystals which could not be identified.
*4: Yield of crystallized material (% by weight)

EXAMPLE 2

A mixture prepared so as to provide the composition shown below (% by weight) was melted for 270 minutes in a platinum crucible placed in an electric furnace maintained at 1,450° C. The resulting molten mixture was placed on an iron plate to provide a 10 mm thick plate and cooled gradually from 600° C. to obtain a glass block. The temperature of the glass block was raised from room temperature to 900° C. in an electric furnace at a rate of 7.5° C. per minute. The glass block was maintained at that temperature for 3 hours to cause crystallization.

| Composition of Glass | % by Weight |
|---|---|
| $SiO_2$ | 49.8 |
| CaO | 39.7 |
| $B_2O_3$ | 2.0 |
| $Li_2O$ | 0.5 |
| $Al_2O_3$ | 4.0 |
| $Na_2O$ | 1.0 |
| $K_2O$ | 3.0 |

In the crystallized glass block after the heat treatment, crystals other than wollastonite crystals were not observed. Furthermore, the wollastonite crystals formed showed excellent directional properties.

The glass block was pulverized and passed through a 14 mesh-screen. About 1 g of the powder that passed through the screen was weighed and soaked in 400 ml of a 1 N aqueous NaOH solution maintained at 85° C. in a Teflon (trademark of Du Pont for polyfluoroethylene materials) beaker for 24 hours.

After water-washing and drying, the weight was measured, and it was found that a reduction in weight was 15.4%. Furthermore, the crystallized glass after the treatment could be converted easily into fine fibrous elements. The aspect ratio was 25.0 in average.

Chemical analysis of the fine fibrous crystallized glass confirmed that it contained almost no glass phase and was almost pure wollastonite crystal (see Table 2).

TABLE 2

| Analysis of Wollastonite Crystal | |
|---|---|
| Composition of Glass | % by Weight |
| $SiO_2$ | 51.7 |
| CaO | 47.0 |
| $B_2O_3$ | 0.39 |
| $Li_2O$ | 0.06 |
| $Al_2O_3$ | 0.10 |
| $Na_2O$ | 0.50 |
| $K_2O$ | 0.25 |

EXAMPLE 3

A mixture prepared so as to provide the composition shown below (% by weight) was treated in the same manner as in Example 2 to produce a crystallized glass. The crystallized glass was subjected to an alkali treatment in a 1 N NaOH solution at 95° C. for 8 hours in the same manner as in Example 2.

| Composition of Glass | % by Weight |
|---|---|
| $SiO_2$ | 49.8 |
| CaO | 39.7 |
| $B_2O_3$ | 3.0 |
| $Li_2O$ | 0.5 |
| $Al_2O_3$ | 3.0 |
| $Na_2O$ | 2.0 |
| $K_2O$ | 2.0 |

The reduction in weight due to the alkali treatment was 14.3%, and almost pure wollastonite crystals having an aspect ratio of 28.3 were obtained.

EXAMPLE 4

A mixture prepared so as to provide the composition shown below was treated in the same manner as in Example 2 to produce a crystallized glass. The crystallized glass was subjected to an alkali treatment in a 0.5 N aqueous NaOH solution at 95° C. for 24 hours in the same manner as in Example 2.

| Composition of Glass | % by Weight |
|---|---|
| $SiO_2$ | 52.5 |
| CaO | 40.0 |
| $B_2O_3$ | 1.0 |
| $Li_2O$ | 0.5 |
| $Al_2O_3$ | 3.0 |
| $Na_2O$ | 2.2 |
| $K_2O$ | 0.8 |

The reduction in weight due to the alkali treatment was 13.3%, and almost pure wollastonite crystals having an aspect ratio of 20.8 were obtained.

EXAMPLE 5

A mixture prepared so as to provide the composition shown below (% by weight) was treated in the same manner as in Example 2 to produce a crystallized glass. The crystallized glass was subjected to an alkali treatment in a 0.5 N aqueous KOH solution at 90° C. for 24 hours in the same manner as in Example 1.

| Composition of Glass | % by Weight |
|---|---|
| $SiO_2$ | 46.0 |

-continued

| Composition of Glass | % by Weight |
|---|---|
| CaO | 42.0 |
| $B_2O_3$ | 3.0 |
| $Li_2O$ | 1.0 |
| $Al_2O_3$ | 3.0 |
| $Na_2O$ | 0 |
| $K_2O$ | 5.0 |

The reduction in weight due to the alkali treatment was 14.5%, and almost pure wollastonite crystals having an aspect ratio of 15.9 were obtained.

EXAMPLE 6

About 1 g of the crystallized glass produced in Example 2 was immersed in 400 ml of a 1 N aqueous KOH solution at 85° C. for 24 hours.

After water-washing and drying, the weight of the above treated glass was measured. The reduction in weight was 15.8%. The crystallized glass after the treatment was an almost pure wollastonite crystal having an aspect ratio of 16.5.

EXAMPLE 7

The crystallized glass produced in Example 2 was treated with a 1 N aqueous NaOH solution maintained at 45° C. When it was immersed for 24 hours, the reduction in weight was only 2.0%. The crystallized glass after immersing in the NaOH solution was not substantially different from the crystallized glass at the stage of being pulverized but not yet being immersed in the NaOH solution, and the aspect ratio was only 4.1.

On the other hand, when the treatment was performed under the same temperature condition as above for 200 hours, the reduction in weight was 14.8%, and the aspect ratio was 20.3.

EXAMPLE 8

A mixture prepared so as to provide the composition shown below (% by weight) was treated in the same manner as in Example 2 to produce a crystallized glass. The crystallized glass was subjected to an alkali treatment in the same manner as in Example 2.

| Composition of Glass | % by Weight |
|---|---|
| $SiO_2$ | 49.8 |
| CaO | 39.7 |
| $B_2O_3$ | 2.0 |
| $Li_2O$ | 0.5 |
| $Al_2O_3$ | 4.0 |
| $Na_2O$ | 4.0 |
| $K_2O$ | 0 |

This composition was the same as the composition of Example 2 with the exception that $Na_2O/(Na_2O+K_2O)$ was controlled to 1.0. The reduction in weight was 8.3% under the same conditions as in Example 2. The aspect ratio of the fibrous crystallized glass after the pulverization was only 8.6.

While the invention has been described in detail and with reference to specific embodiments thereof, it will be apparent to one skilled in the art that various changes and modifications can be made therein without departing from the spirit and scope thereof.

What is claimed is:

1. A glass composition suitable for production of a fibrous wollastonite consisting essentially of, in % by weight:

| $SiO_2$ | 35 to 60 |
|---|---|
| CaO | 30 to 55 |
| $B_2O_3$ | 1 to 30 |
| $Li_2O$ | 0 to 4 |
| $Al_2O_3$ | 0 to 8 |
| and $Na_2O + K_2O$ | 0 to 8, | wherein at least one of $Li_2O$, $Al_2O_3$, and $Na_2O$ is present.

2. A glass composition as in claim 1, consisting essentially of, in % by weight:

| $SiO_2$ | 45 to 55 |
|---|---|
| CaO | 35 to 45 |
| $B_2O_3$ | 1 to 6 |
| $Li_2O$ | 0.2 to 2 |
| $Al_2O_3$ | 1 to 6 |
| and $Na_2O + K_2O$ | 1 to 5. |

3. A method for producing a fibrous wollastonite which comprises uniformly and simultaneously heat treating all portions of a glass consisting essentially of, in % by weight:

| $SiO_2$ | 35 to 60 |
|---|---|
| CaO | 30 to 55 |
| $B_2O_3$ | 1 to 30 |
| $Li_2O$ | 0 to 4 |
| $Al_2O_3$ | 0 to 8 |
| and $Na_2O + K_2O$ | 0 to 8 | to form a crystallized glass containing therein bundles of needle wollastonite crystals, and thereafter treating the crystallized glass to disintegrate the bundles of the wollastonite crystals by one or more treatment methods including pulverization, rapid cooling of crystallized glass heated to high temperatures, and immersion of the crystallized glass in an aqueous alkaline eluting solution to selectively elute only the glass phase present in the crystallized glass.

4. A method as in claim 3, wherein the glass composition consists essentially of, in % by weight:

| $SiO_2$ | 45 to 55 |
|---|---|
| CaO | 35 to 45 |
| $B_2O_3$ | 1 to 6 |
| $Li_2O$ | 0.2 to 2 |
| $Al_2O_3$ | 1 to 6 |
| and $Na_2O + K_2O$ | 1 to 5. |

5. A method as in claim 3, wherein the heat treatment is conducted at from 750° C. to 1,150° C. for at least 2 hours.

6. A method as in claim 3, wherein the physical treatment is pulverization.

7. A method as in claim 3, wherein the physical treatment is a method comprising rapidly cooling the crystallized glass heated at high temperature to cleave bundles of the needle wollastonite crystals.

8. A method as in claim 3, wherein the chemical treatment is a method comprising immersing the crystallized glass in an eluting solution to selectively elute only the glass phase present in the crystallized glass.

9. A method as in claim 8, wherein the eluting solution is an aqueous alkaline solution.

10. A method as in claim 9, wherein the glass composition consists essentially of, in % by weight:

| | |
|---|---|
| $SiO_2$ | 45 to 55 |
| CaO | 35 to 45 |
| $B_2O_3$ | 1 to 6 |
| $Li_2O$ | 0.2 to 2 |
| $Al_2O_3$ | 1 to 6 |
| and $Na_2O + K_2O$ | 1 to 7 |
| with $Na_2O$ | 0 to 4 and |
| $K_2O$ | 1 to 7 | wherein the weight ratio of $Na_2O/Na_2O+K_2O$ is from 0/1 to 0.8/1.

11. A fibrous wollastonite obtained by heat treating a glass consisting essentially of, in % by weight:

| | |
|---|---|
| $SiO_2$ | 35 to 60 |
| CaO | 30 to 55 |
| $B_2O_3$ | 1 to 30 |
| $Li_2O$ | 0 to 4 |
| $Al_2O_3$ | 0 to 8 |
| and $Na_2O + K_2O$ | 0 to 8 | to form a crystallized glass containing therein bundles of needle wollastonite crystals, and thereafter treating the crystallized glass to disintegrate the bundles of the wollastonite crystals by a treatment method comprising immersion of the crystallized glass in an aqueous alkaline eluting solution to selectively elute only the glass phase present in the crystallized glass.

12. A fibrous wollastonite as in claim 11, wherein the glass composition consists essentially of, in % by weight:

| | |
|---|---|
| $SiO_2$ | 45 to 55 |
| CaO | 35 to 45 |
| $B_2O_3$ | 1 to 6 |
| $Li_2O$ | 0.2 to 2 |
| $Al_2O_3$ | 1 to 6 |
| and $Na_2O + K_2O$ | 1 to 5. |

13. A fibrous wollastonite as in claim 11, wherein the heat treatment is conducted at from 750° C. to 1,150° C. for at least 2 hours.

14. A fibrous wollastonite as in claim 11, wherein the glass composition consists essentially of, in % by weight:

| | |
|---|---|
| $SiO_2$ | 45 to 55 |
| CaO | 35 to 45 |
| $B_2O_3$ | 1 to 6 |
| $Li_2O$ | 0.2 to 2 |
| $Al_2O_3$ | 1 to 6 |
| and $Na_2O + K_2O$ | 1 to 7 |
| with $Na_2O$ | 0 to 4 and |
| $K_2O$ | 1 to 7 | wherein the weight ratio of $Na_2O/Na_2O+K_2O$ is from 0/1 to 0.8/1.

* * * * *

UNITED STATES PATENT AND TRADEMARK OFFICE
CERTIFICATE OF CORRECTION

PATENT NO. : 4,443,550
DATED : April 17, 1984
INVENTOR(S) : Makoto Kume et al.

It is certified that error appears in the above-identified patent and that said Letters Patent is hereby corrected as shown below:

Claim 1, line 7, "0 to 4" should read --0.2 to 4--.

Signed and Sealed this

Sixteenth Day of October 1984

[SEAL]

Attest:

GERALD J. MOSSINGHOFF

Attesting Officer

Commissioner of Patents and Trademarks